3,141,862
GRAFT COPOLYMERIZATION USING BORON ALKYLS IN THE PRESENCE OF OXYGEN AS CATALYSTS
Isidor Kirshenbaum, Westfield, Stanley B. Mirviss, Roselle, and Gabriel Karoly, Elizabeth, N.J., assignors to Esso Research and Engineering Company, a corporation of Delaware
No Drawing. Filed Mar. 1, 1961, Ser. No. 92,478
14 Claims. (Cl. 260—45.5)

This invention relates to an improved method of preparing graft copolymers of solid hydrocarbon polymers. More particularly, it relates to a process of that nature effected through the use of boron alkyls.

In the recent past, so-called "low pressure" solid poly-alpha-olefin polymers have been attracting increasing attention as plastics. These polymers have been prepared by the now well-known process of polymerizing the monomer with catalyst systems made up of a partially reduced, reducible, heavy, transition metal halide and a reducing, metal-containing compound to high density, isotactic, high molecular weight, solid, relatively linear products.

It has been desired, in order to increase the utility of these polymers, to improve their dye receptivity, stress cracking characteristics, flame resistance, and to increase their functionality. The conventional processes for overcoming these difficulties by graft copolymerization are not as efficient as desired.

It has now been found that graft copolymers of the indicated hydrocarbon polymers can be prepared by contacting those polymers with a boron alkyl in the presence of an oxygen-containing gas at ambient temperatures and then contacting the thus treated polymer with a polar monomer.

The alpha-olefin hydrocarbon polymers are those from monomers in the $C_2$ to $C_{10}$ range, preferably $C_2$ to $C_6$. Thus, the monomers include ethylene, propylene, 1-butene, 3-methyl-1-butene, 4-methyl-1-pentene, etc. The process is also applicable to high pressure polyethylene and polyisobutylene.

The boron alkyls utilized in the first contacting step are those in which the alkyl component has from $C_1$ to $C_{20}$ carbon atoms, preferably $C_4$ to $C_8$. Boron hexyl and boron octyl are particularly desirable.

Inert diluents such as cyclohexane, n-heptane, n-dodecane, benzene, toluene, and ethers such as tetrahydrofuran or dibutyl ether can be utilized.

The boron alkyl is added in an amount of from about 1 to 20 wt. percent based on polymer, preferably 5–15 wt. percent.

The polymer with the boron alkyl is contacted with an oxygen-containing gas, suitably air, at ambient temperature, i.e., in the range of 15° C. to 50° C., preferably 20–30° C. The amount of oxygen should be at least 1–3 moles $O_2$ per mole of the boron alkyl present and preferably in larger excess.

It is not necessary to remove the boron alkyl prior to the subsequent treatment. However, the oxygen treated boron alkyl polymer mixture may be treated with solvent prior to addition of the graft monomer without important loss in ability to form graft polymers. This solvent treatment may, for example, be used where large amounts of boron alkyl are present and it is desired to limit the amount of boron in the final polymer. The boron alkyl or derivatives can be removed with solvents such as methanol, isopropanol, acetone and other ketones. The solvent to be used depends upon the nature of the polyolefin.

The polymer which has been treated with boron alkyl and the oxygen containing gas is then contacted with a polar monomer for the graft copolymerization. This can be done with or without prior treatment with solvent to remove boron alkyl, etc.

The polar monomers that can be employed are those containing an ethylenic double bond and one or more chemically active groups, e.g., the system C=C—X where X is a halogen, a cyano group, a heterocyclic group, or $CO_2R$ group. In some cases X may also be a vinyl, aryl, CHO, etc. group. Especially effective polar monomers are, for example, 4-vinyl pyridine, acrylonitrile, and vinyl chloride. The polar monomer is conveniently utilized in an amount of from 1 to 100 wt. percent based on polymer and preferably about 5–25 wt. percent.

The temperature employed in this treating step is conveniently in the range of 20 to 150° C., preferably 60 to 100° C. The time of treatment is conveniently in the range of from 10 minutes to 6 hours or more and preferably 20 minutes to 2 hours.

The treatment can be carried out in the same diluent as employed in the previous step. The ratio of diluent to polymer to monomer controls the extent of graft polymerization and can be varied as desired.

After the graft polymerization, the resultant product is diluted with a diluent which will facilitate coagulation, precipitation, or separation of the polymer. Diluents such as methanol or isopropanol are especially desirable in many cases. The polymer is then separated, e.g., by filtration, and may be dried. The polymer is then preferably treated with a suitable solvent to remove homopolymer, if any, formed from the "graft" monomer.

One of the more suitable type polyolefin polymers for the graft polymerization can be prepared by the low pressure polymerization process. For the purpose of convenience, details of the low pressure catalytic process and the products obtained thereby are presented below, although it should be realized that these by themselves constitute no part of this invention. The process is generally described in the literature, e.g., see "Scientific American," September 1957, pages 98 et seq.

In that process the polymers are prepared by polymerizing the monomer with the aid of certain polymerization catalysts. The catalysts are solid, insoluble reaction products obtained by partially reducing a heavy metal compound usually the halide of a Group IV–B, V–B and VI–B metal of the Periodic System, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see copending U.S. application Serial No. 578,198, filed April 6, 1956, and Serial No. 766,376, filed October 19, 1958.) The product is then activated with an aluminum alkyl compound corresponding to the formula RR'AlX. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid and the polymer product concentration in the polymerization zone is preferably kept between about 2 to 15% based on total contents so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for deashing such as acetylactone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The polymers produced have molecular weights in the range of about 50,000 to 300,000 or even as high as 3,000,000 as determined by the intrinsic viscosity method using the correlation of Chiang (J. Polymer Science, 28, 235, 1958).

It is to be understood that the term "low pressure" polymer as used herein connotes material prepared in the indicated manner. Other polyolefins suitable for this invention can be prepared with other catalysts, such as Friedel-Crafts catalysts, e.g., $AlCl_3$, $BF_3$, $SnCl_4$ etc., or peroxides, e.g., di-t-butyl peroxide, cumene hydroperoxide, etc., or azo compounds, e.g., azobisisobutyronitrile or air.

This invention and its advantages will be better understood by reference to the following examples.

*Example 1*

This experiment demonstrates the graft polymerization of 4-vinylpyridine onto polypropylene.

20 grams of uninhibited isotactic polypropylene (M.P. 165° C., inherent viscosity 3.5), 2 cc. boron trihexyl and 200 cc. of benzene were treated at ambient temperatures for 30 minutes with 0.5 l./min. of air. The mixture was then flushed with $N_2$ and 100 cc. of benzene was added. To this product was added 20 cc. of freshly distilled vinyl pyridine and the mixture heated to 80° C. for two hours. After cooling, methanol was added to the reaction mixture, and the precipitate separated by filtration, dried and extracted three times with 1 liter each time of a 1/1 benzene-acetone mixture at boiling temperatures. The white polymeric product was found by analysis to contain 13.8% 4-vinyl pyridine grafted onto the polypropylene. The product had the following properties:

|  | Polymer of This Example | Polypropylene Feed |
| --- | --- | --- |
| Percent N | 1.84 | 0 |
| Melting pt., ° C | 165 | 165 |
| Viscosity | 3.4 | 3.5 |

The extraction with benzene/acetone mixture is to remove polyvinyl pyridine homopolymers as disclosed in Ind. Patent 63,445.

*Example 2*

This experiment shows that washing the polypropylene with methanol after air treatment (to remove soluble boron compounds) did not prevent formation of graft polymer.

20 grams of isotactic polymer of Example 1 treated with air in the presence of boron trihexyl and benzene as in Example 1. The product was filtered and washed with 2 liters of a 1/1 by volume benzene-methanol solution to remove soluble catalyst. The washed but activated polypropylene was then mixed with 100 cc. of benzene and 50 cc. of 5-vinyl pyridine and treated as in Example 1. The product after extraction was a white solid containing 8.3% vinyl pyridine grafted on polypropylene. The product had an inherent viscosity of 4.28.

*Example 3*

This example shows that polypropylene is involved in the polymerization reactions.

Same as in Example 1 but no polypropylene present. Product was a gummy brown resin as contrasted to the high melting white powder of Example 1.

*Example 4*

This example shows that excessive temperature is to be avoided.

Same as Example 1, except that much higher concentration of vinyl pyridine used, i.e., 275 cc. of 4-vinyl pyridine and less benzene. Reaction temperature was as high as 125° C. The product was gummy and contained gel.

*Example 5*

This example shows need for boron alkyl during air treatment.

Same as Example 1, but no boron alkyl present. No graft polymer obtained.

*Example 6*

This experiment shows graft polymerization of acrylonitrile onto polyethylene.

Twenty grams of uninhibited polyethylene was slurried in 400 cc. of benzene. Then 2 cc. of boron trihexyl was added and the mixture air blown for 1 hour with 0.5 l./min. of air at 25° C. The mixture was flushed with $N_2$ and 20 cc. of freshly distilled acrylonitrile was added. The reaction mixture was held at 60° C. for 1 hour. The product was then cooled, precipitated with methanol, filtered, washed and dried. The resultant white powder was extracted with methyl ethyl ketone in a Soxhlet extractor for 24 hours. The polymer was then dried and analyzed. It was found to contain 5.1% acrylonitrile grafted onto the polyethylene.

*Example 7*

This experiment shows that polyethylene enters reaction.

Same as Example 6 but no polyethylene present. Result—no solid polymer obtained even after adding 800 cc. of methanol. A very small amount (1.5 grams) of solid obtained after adding 200 cc. of water to mixture and cooling to —20° C.

*Example 8*

This experiment involves acrylonitrile and polypropylene.

This was the same as Example 6 except that polypropylene was used in place of polyethylene. The white product contained 13.4% acrylonitrile after extraction grafted onto the polypropylene. This graft polymer had the following properties:

|  | Polymer of This Example | Polypropylene Feed |
| --- | --- | --- |
| Percent N | 3.56 | 0 |
| Softening Pt., ° C | 153 | 145 |
| Melting Pt., ° C | 175 | 165 |

The graft polymer was dyeable with basic dyes in contrast to the polypropylene which did not dye with basic dyes.

*Example 9*

This experiment involves acrylonitrile and polybutene-1.

Same as Example 6 except that polybutene-1 is used in place of polyethylene. In this case the polymer feed dissolves in the benzene to form a solution at room temperature. The product was a white powder containing 17 wt. percent acrylonitrile after extraction and had a softening point of 105° C. and an melting point of 127° C.

*Example 10*

This experiment involves vinyl chloride with polybutene-1.

Twenty grams of uninhibited polybutene was mixed in 400 cc. of benzene. Then 2 cc. of boron trihexyl added and the mixture air blown as in Example 6. The mixture was flushed with $N_2$ and heated to 70° C. and vinyl chloride bubbled through for 1 hour. The reaction mixture was cooled and treated as in Example 6. The white product contained 2.3 wt. percent vinyl chloride grafted onto the polybutene.

*Example 11*

This experiment involves acrylonitrile for polypropylene and is thus similar to Example 8 except for the use of boron trioctyl in place of boron trihexyl. A white product containing acrylonitrile grafted onto polypropylene is obtained.

*Example 12*

This example is the same as Example 11 except for the use of boron tributyl. A white product similar to that of Example 11 is obtained.

The advantages of this invention will be apparent to those skilled in the art. A novel and efficient process is provided for preparing products of more useful characteristics including increased dye receptivity and softening and melting points. The invention provides a versatile way of modifying polyolefins by attaching a suitable handle for further chemical reactions, e.g., dyeing.

It is to be understood that this invention is not limited to the specific examples which have been offered merely as illustrations and that modifications may be made without departing from the spirit of the invention.

What is claimed is:

1. A process of preparing a graft copolymer which comprises contacting a solid, hydrocarbon polymer, in the presence of an inert organic diluent with a boron alkyl and an oxygen-containing gas at a temperature in the range of 20 to 150° C. and then contacting the thus treated polymer with a polar monomer at a temperature in the range of 20 to 150° C.

2. The process of claim 1 in which the oxygen-containing gas is air.

3. The process of claim 2 in which the polymer is that of a monomer in the $C_2$ to $C_6$ range.

4. The process of claim 3 in which the boron alkyl has from 4 to 8 carbon atoms.

5. The process of claim 4 in which the boron alkyl is utilized in an amount of from about 1 to 20 wt. percent based on the polymer.

6. The process of claim 5 in which the polar monomer is utilized in an amount of from about 5 to 25 wt. percent based on polymer.

7. The process of claim 6 in which the polymer is polypropylene and the polar monomer is 4-vinyl pyridine.

8. The process of claim 6 in which the polymer is polyethylene and the polar monomer is acrylonitrile.

9. The process of claim 6 in which the polymer is polypropylene and the polar monomer is acrylonitrile.

10. The process of claim 6 in which the polymer is polybutene-1 and the polar monomer is acrylonitrile.

11. The process of claim 6 in which the polymer is polybutene-1 and the polymer monomer is vinyl chloride.

12. The process of claim 6 in which the boron alkyl is boron trihexyl.

13. The process of claim 6 in which the boron alkyl is boron trioctyl.

14. The process of claim 6 in which the boron alkyl is boron tributyl.

References Cited in the file of this patent

UNITED STATES PATENTS 2,841,569   Rugg et al. _____ July 1, 1958

OTHER REFERENCES

Furukawa: Journal Polymer Science, volume 28, 1957, pages 227–229.